US009566478B2

(12) United States Patent
Boyd et al.

(10) Patent No.: US 9,566,478 B2
(45) Date of Patent: Feb. 14, 2017

(54) GOLF CLUB WITH NON-METALLIC FASTENERS (71) Applicant: NIKE, INC., Beaverton, OR (US)

(72) Inventors: Robert Boyd, Flower Mound, TX (US); Matthew S. Young, Columbus, OH (US); Mark J. Perry, Hilliard, OH (US); Megan Sesslar Moore, Hilliard, OH (US)

(73) Assignee: NIKE, Inc., Beaverton, OR (US)

( * ) Notice: Subject to any disclaimer, the term of this patent is extended or adjusted under 35 U.S.C. 154(b) by 335 days.

(21) Appl. No.: 14/256,586

(22) Filed: Apr. 18, 2014

(65) Prior Publication Data
US 2014/0228152 A1 Aug. 14, 2014

Related U.S. Application Data (62) Division of application No. 12/533,096, filed on Jul. 31, 2009, now abandoned.

(51) Int. Cl.
A63B 53/04 (2015.01)
F16B 33/00 (2006.01)

(52) U.S. Cl.
CPC .......... A63B 53/04 (2013.01); A63B 53/0466 (2013.01); F16B 33/006 (2013.01); A63B 2053/0416 (2013.01); A63B 2053/0491 (2013.01); A63B 2209/00 (2013.01); A63B 2209/02 (2013.01)

(58) Field of Classification Search
USPC .................................................. 473/324–350
See application file for complete search history.

(56) References Cited

U.S. PATENT DOCUMENTS

| 863,728 | A | 8/1907 | Legh |
| 1,509,429 | A | 9/1924 | Hillerich |
| 1,526,438 | A | 2/1925 | Essert |
| 1,589,363 | A | 6/1926 | Butchart |

(Continued)

FOREIGN PATENT DOCUMENTS

| CN | 101102822 A | 1/2008 |
| DE | 102009032990 A1 | 2/2010 |

(Continued)

OTHER PUBLICATIONS

Communication Relating to the Results of the Partial International Search for PCT/US2010/039596, Dated Nov. 15, 2010.

(Continued)

Primary Examiner — Alvin Hunter
(74) Attorney, Agent, or Firm — Banner & Witcoff, Ltd.

(57) ABSTRACT

A golf club with a golf club head having non-metallic fasteners is presented. The club head may include a face member, a body member, a sole member and a crown member. The various portions of the club head may be connected using mechanical fasteners, such as screws. In some arrangements, the screws may be formed of a non-metallic material, such as a composite material, in order to reduce weight associated with the club head. In some arrangements, a portion of the mechanical fasteners may be formed of a non-metallic material and may be placed in regions of the club head where reduced weight is desired, while another portion of the fasteners may be formed of metal or other heavier material and may be placed in regions where additional weight may be desired.

13 Claims, 6 Drawing Sheets

(56) References Cited

U.S. PATENT DOCUMENTS

| | | |
|---|---|---|
| 1,942,434 A | 1/1934 | Link |
| 2,214,356 A | 9/1940 | Wettlaufer |
| 2,510,693 A | 6/1950 | Green |
| 2,756,055 A | 7/1956 | Bittner |
| 2,960,338 A | 11/1960 | Havey et al. |
| 3,102,571 A | 9/1963 | Scott |
| 3,190,651 A | 6/1965 | Thomas |
| 3,390,881 A | 7/1968 | Senne |
| 3,495,494 A | 2/1970 | Scott |
| 3,529,508 A | 9/1970 | Cooksey |
| 3,556,533 A | 1/1971 | Hollis |
| 3,567,228 A | 3/1971 | Lynn |
| 3,692,306 A | 9/1972 | Glover |
| 4,021,047 A | 5/1977 | Mader |
| 4,306,721 A * | 12/1981 | Doyle ............... A63B 69/3685 473/238 |
| 4,553,755 A | 11/1985 | Yamada |
| 4,618,149 A | 10/1986 | Maxel |
| 4,658,088 A | 4/1987 | Gartland, Jr. et al. |
| 4,759,670 A | 7/1988 | Linder et al. |
| 4,776,737 A | 10/1988 | Wollar |
| 4,804,188 A | 2/1989 | McKee et al. |
| 4,815,740 A * | 3/1989 | Williams ............ A63B 53/065 403/97 |
| 4,821,447 A | 4/1989 | Nakayama et al. |
| 4,863,330 A | 9/1989 | Olez et al. |
| 4,872,685 A | 10/1989 | Sun |
| 4,890,840 A | 1/1990 | Kobayashi |
| 4,909,690 A | 3/1990 | Gapp et al. |
| 4,929,505 A | 5/1990 | Washburn et al. |
| 5,018,921 A | 5/1991 | Pinney |
| 5,098,240 A | 3/1992 | Gapp et al. |
| 5,127,783 A | 7/1992 | Moghe et al. |
| 5,133,553 A * | 7/1992 | Divnick ............... A63B 53/06 403/97 |
| 5,152,650 A | 10/1992 | Kitagawa |
| 5,172,913 A | 12/1992 | Bouquet |
| 5,221,087 A * | 6/1993 | Fenton ............... A63B 53/04 473/342 |
| 5,252,016 A | 10/1993 | Schmid et al. |
| 5,261,664 A | 11/1993 | Anderson |
| 5,273,283 A | 12/1993 | Bowland |
| 5,358,249 A | 10/1994 | Mendralla |
| 5,362,055 A | 11/1994 | Rennie |
| 5,405,227 A | 4/1995 | His et al. |
| 5,464,211 A | 11/1995 | Atkins, Sr. |
| 5,505,453 A | 4/1996 | Mack |
| 5,538,245 A * | 7/1996 | Moore ............... A63B 53/06 403/97 |
| 5,584,770 A | 12/1996 | Jensen |
| 5,720,673 A | 2/1998 | Anderson |
| 5,728,445 A | 3/1998 | Murakami et al. |
| 5,735,174 A | 4/1998 | Enomoto |
| 5,776,011 A | 7/1998 | Su et al. |
| 5,788,584 A | 8/1998 | Parente et al. |
| 5,807,188 A | 9/1998 | Serrano et al. |
| 5,882,162 A | 3/1999 | Kaneko |
| 5,911,102 A | 6/1999 | Takahashi et al. |
| 5,911,638 A | 6/1999 | Parente et al. |
| 5,971,867 A | 10/1999 | Galy |
| 6,017,280 A | 1/2000 | Hubert |
| 6,027,686 A | 2/2000 | Takahashi et al. |
| 6,033,318 A | 3/2000 | Drajan, Jr. et al. |
| 6,080,068 A | 6/2000 | Takeda |
| 6,102,813 A | 8/2000 | Dill |
| 6,183,377 B1 | 2/2001 | Liang |
| 6,306,048 B1 | 10/2001 | McCabe et al. |
| 6,494,655 B1 | 12/2002 | Pritchard |
| 6,527,774 B2 | 3/2003 | Lieberman |
| 7,108,611 B2 | 9/2006 | MacIlraith |
| 7,162,899 B2 * | 1/2007 | Fawcett ............... E05B 45/005 242/382 |
| 7,281,985 B2 | 10/2007 | Galloway |
| 7,338,390 B2 | 3/2008 | Lindsay |
| 7,347,796 B2 | 3/2008 | Takeda |
| 7,354,355 B2 * | 4/2008 | Tavares ............... A63B 53/04 473/329 |
| 7,377,861 B2 | 5/2008 | Tateno et al. |
| 7,431,668 B2 | 10/2008 | Tateno et al. |
| 7,435,191 B2 | 10/2008 | Tateno et al. |
| 7,481,720 B2 | 1/2009 | Tavares |
| 7,628,713 B2 | 12/2009 | Tavares |
| 7,713,143 B2 | 5/2010 | Evans |
| 7,837,577 B2 | 11/2010 | Evans |
| 7,871,334 B2 * | 1/2011 | Young ............... A63B 53/04 473/231 |
| 7,966,711 B2 | 6/2011 | Keener |
| 8,608,585 B2 * | 12/2013 | Stites ............... A63B 53/04 473/282 |
| 2007/0149316 A1 | 6/2007 | Nishino |
| 2007/0156145 A1 | 7/2007 | Demakas et al. |
| 2007/0233260 A1 | 10/2007 | Cragg |
| 2009/0042667 A1 | 2/2009 | Lin et al. |
| 2009/0178266 A1 | 7/2009 | Chen |

FOREIGN PATENT DOCUMENTS

| | | |
|---|---|---|
| EP | 0722048 A2 | 7/1996 |
| EP | 1090595 A2 | 4/2001 |
| JP | 01244770 | 9/1989 |
| JP | 02142578 | 5/1990 |
| JP | 03140609 B2 | 6/1991 |
| JP | H0360971 U | 6/1991 |
| JP | H0510318 | 1/1993 |
| JP | H05126123 A | 5/1993 |
| JP | 06114126 | 4/1994 |
| JP | H06269521 A | 9/1994 |
| JP | 08150232 | 6/1996 |
| JP | H09229039 A | 9/1997 |
| JP | 2003245380 A | 9/2003 |
| JP | 2003310808 | 11/2003 |
| JP | 2005152074 A | 6/2005 |
| JP | 2006122544 A | 5/2006 |
| JP | 2006223354 A | 8/2006 |
| JP | 3126135 U | 9/2006 |
| JP | 2007-167554 A | 7/2007 |
| WO | 2008157655 A1 | 12/2008 |
| WO | 2010028118 A2 | 3/2010 |

OTHER PUBLICATIONS

International Search Report and Written Opinion Dated Jan. 18, 2011 for PCT/US2010/039596.

Japan Office Action Dated Aug. 21, 2013 for Application No. JP2012-522840.

Office Action Dated Jun. 23, 2014 in Chinese Application No. 201080036714.8, No Translation Available.

Aug. 7, 2014—(EP) Extended Search Report—App. 14171674.6.

* cited by examiner

GOLF CLUB WITH NON-METALLIC FASTENERS

CROSS-REFERENCE TO RELATED APPLICATIONS

This application is a divisional of pending U.S. patent application Ser. No. 12/533,096 filed on Jul. 31, 2009, and claims priority thereto, the contents of which is incorporated herein by reference in its entirety.

FIELD OF THE INVENTION

This invention relates generally to golf clubs. In particular, the invention relates to golf clubs and golf club head structures having non-metallic fasteners, such as composite fasteners, connecting various portions of the golf club and/or golf club head.

BACKGROUND

As the popularity of the game of golf has increased in recent decades, golf club designers have continued to develop new ways to improve performance of clubs, reduce weight associated with clubs, etc. In addition, club designers are often looking for new ways to redistribute weight associated with a golf club and/or golf club head. Golf clubs are assembled using various methods of connection, such as adhesives, mechanical fasteners, and the like. Accordingly, it would be advantageous to provide a method of connection for various portions of a golf club and/or golf club head that reduced the overall weight of a club and/or redistributed weight to desired areas.

SUMMARY

The following presents a general summary of aspects of the invention in order to provide a basic understanding of the invention and various features of it. This summary is not intended to limit the scope of the invention in any way, but it simply provides a general overview and context for the more detailed description that follows.

Aspects of this invention relate to golf clubs and golf club head structures having non-metallic fasteners connecting various portions of the club head structure. In some arrangements, a club head may include one or more club head body members, a ball striking member, a sole member and a crown member. Mechanical fasteners, such as screws, may be used to connect these various club head members. In some examples, the mechanical fasteners may be screws made of a non-metallic material, such as a composite material. Use of non-metallic fasteners may reduce overall weight of the club head.

In other arrangements, a portion of the fasteners may be non-metallic while other fasteners may be formed of a heavier or denser material, such as metal. These heavier fasteners may be used to connect portions of the club head where increased weight may provide improved performance, e.g., in a sole region, at a rear of the club head, etc.

BRIEF DESCRIPTION OF THE DRAWINGS

A more complete understanding of the present invention and certain advantages thereof may be acquired by referring to the following detailed description in consideration with the accompanying drawings, in which.

The reader is advised that the attached drawings are not necessarily drawn to scale.

DETAILED DESCRIPTION

In the following description of various example structures in accordance with the invention, reference is made to the accompanying drawings, which form a part hereof, and in which are shown by way of illustration various example articles, including one or more golf club or golf club head structures. Additionally, it is to be understood that other specific arrangements of parts and structures may be utilized and structural and functional modifications may be made without departing from the scope of the present invention. Also, while the terms "top," "bottom," "front," "back," "rear," "side," "underside," "overhead," and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this invention. Further, the invention generally will be described as it relates to wood-type golf clubs. However, aspects of the invention may be used with any of several types of golf clubs, including hybrid type golf clubs, utility clubs, and the like and nothing in the specification or figures should be construed to limit the invention to use with the wood-type golf clubs described.

A. General Description of an Illustrative Golf Club with Golf Club Head Having Non-Metallic Fasteners In general, as described above, aspects of this invention relate to a golf club or golf club head structure. More detailed descriptions of aspects of this invention follow.

1. Example Golf Clubs Having Non-Metallic Fasteners

Aspects of this invention relate to golf club and golf club head structures. In at least some examples, the golf club head includes a club head body and a club face. The golf club head may include a first mechanical fastener formed of a non-metallic material connecting the club face to the club head body. The golf club head further includes a second mechanical fastener connecting the club face to the club head body. In some arrangements, the first mechanical fastener may have a first weight and the second mechanical fastener may have a second weight different from the first weight. In some examples, the second weight may be greater than the first weight. In still other examples, the first mechanical fastener may connect the club face to the club head body at a top perimeter of the club face and the second mechanical fastener may connect the club face to the club head body at a bottom perimeter of the club face.

In still other arrangements, a golf club head may include a body member. The golf club head may include a sole member arranged on a bottom side of the body member and a crown member arranged on a top side of the body member. In some examples, at least one of the body member, sole member and crown member are connected to another of the body member, sole member and crown member via mechanical fasteners. In at least some examples, at least one of the mechanical fasteners is formed of a non-metallic material.

In still other arrangements, a golf club head may include at least one body member and a ball striking member connected to the at least one body member. In some examples, the golf club head may include a crown member connected to the at least one body member via a first mechanical fastener. In at least some examples, the first mechanical fastener is formed of a first material. In some arrangements, the golf club head may include a sole member connected to the at least one body member via a second mechanical fastener. In at least some examples, the second mechanical fastener is formed of a second material different from the first material.

Additional aspects and specific examples of the articles described above will be described in detail more fully below. The reader should understand that these specific examples are set forth merely to illustrate examples of the invention, and they should not be construed as limiting the invention.

B. Specific Examples of the Invention

Referring to the figures and following discussion, golf clubs and golf club heads in accordance with the present invention are described. As discussed above, the golf club and golf club head structures described herein may be described in terms of wood-type golf clubs. However, the present invention is not limited to the precise arrangements disclosed herein but applies to golf clubs generally, including hybrid clubs, and the like.

Example golf club and golf club head structures in accordance with this invention may relate to "wood-type" golf clubs and golf club heads, e.g., clubs and club heads typically used for drivers and fairway woods, as well as for "wood-type" utility or hybrid clubs, or the like. Although these club head structures may have little or no actual "wood" material, they still may be referred to conventionally in the art as "woods" (e.g., "metal woods," "fairway woods," etc.). The golf club heads described herein may include a multiple piece construction and structure, e.g., including one or more of a sole member, a face member (optionally including a ball striking face integrally formed therein or attached thereto), one or more body members (e.g., material extending around the perimeter and making up the club head body), a crown member, a face plate, a face frame member (to which a ball striking face may be attached), an aft body, etc. Of course, if desired, various portions of the club head structure may be integrally formed with one another, as a unitary, one piece construction, without departing from the invention (e.g., the body member(s) may be integrally formed with the sole and/or crown members, the face member may be integrally formed with the sole, body, and/or crown members, etc.). Optionally, if desired, the various portions of the club head structure (such as the sole member, the crown member, the face member, the body member(s), etc.) individually may be formed from multiple pieces of material without departing from this invention (e.g., a multi-piece crown, a multi-piece sole, etc.). Also, as other alternatives, if desired, the entire club head may be made as a single, one piece, unitary construction, or a face plate member may be attached to a one piece club head aft body (optionally, a hollow body, etc.). More specific examples and features of golf club heads and golf club structures according to this invention will be described in detail below in conjunction with the example golf club structures illustrated in FIGS. 1 through 5.

Figure 1A:
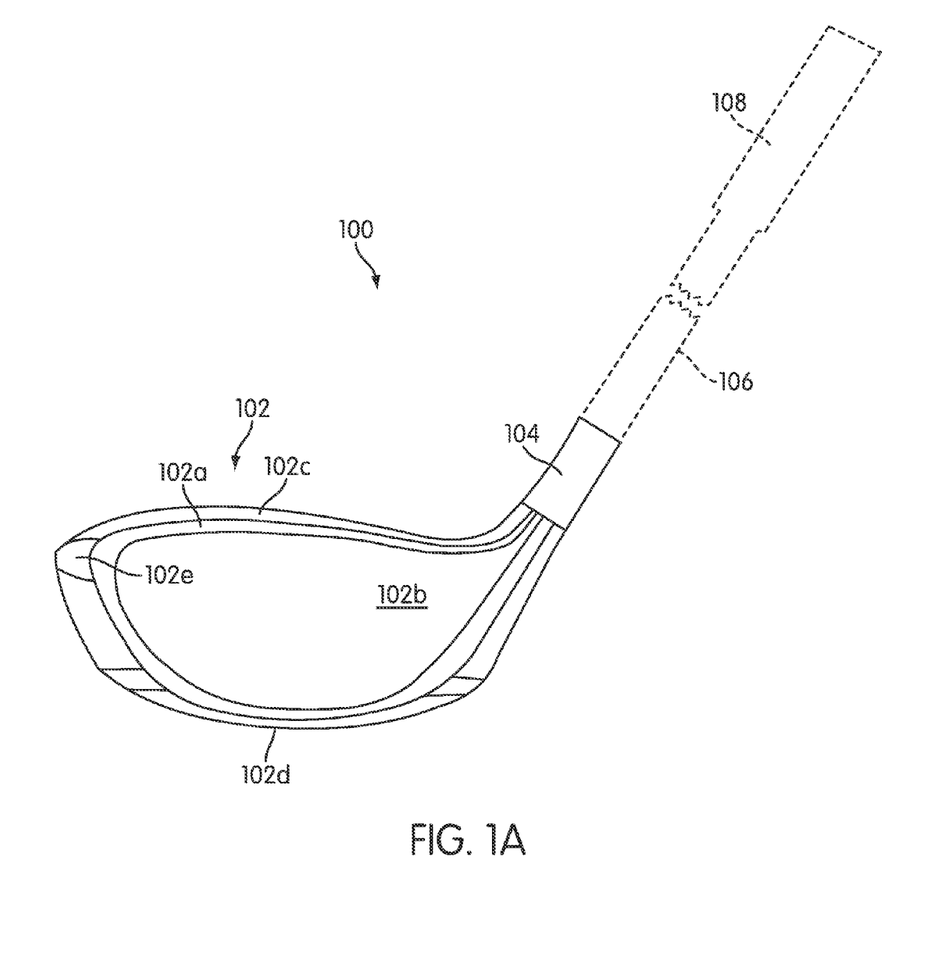
FIG. 1A is an example golf club that may be used in accordance with illustrative aspects of the invention.
Figure 1B:
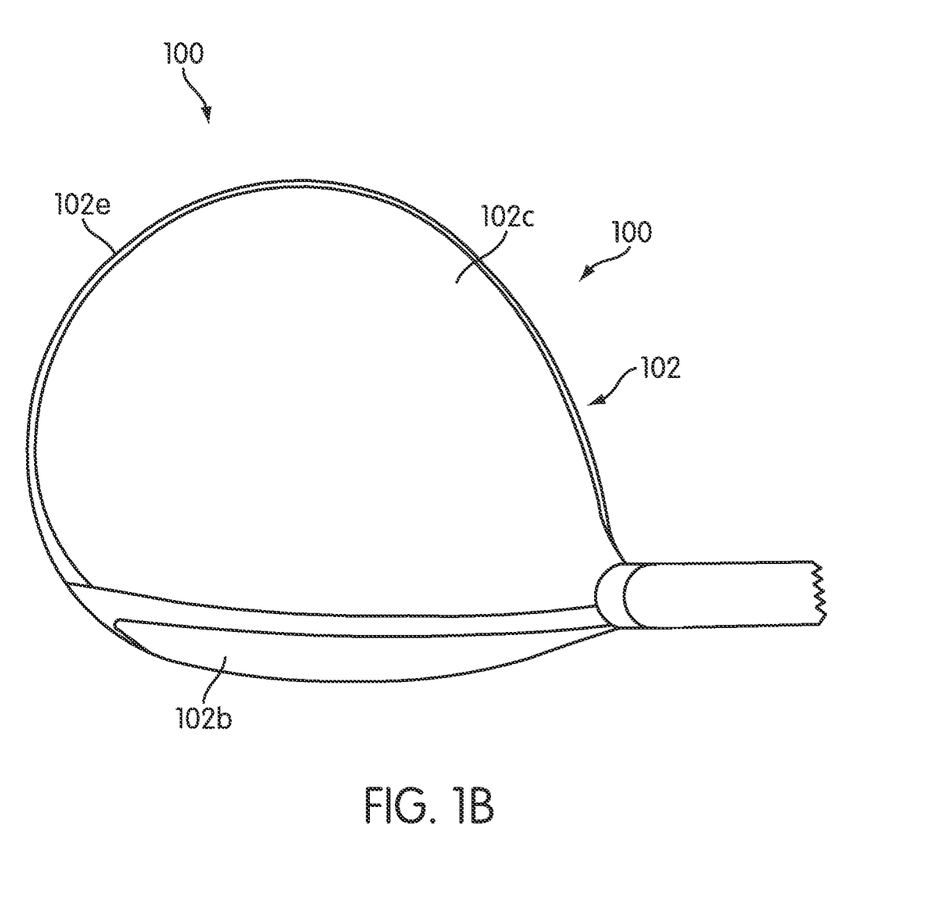
FIG. 1B is a top view of the example golf club of FIG. 1A in accordance with aspects of the invention.

FIGS. 1A and 1B generally illustrate a wood-type golf club 100 that may be used in accordance with one example of this invention. The golf club 100 includes a golf club head 102 having a multi-part construction (as will be described in more detail below) and a hosel area 104 at which the head 102 is connected to a shaft 106. The hosel area 104 may be of any desired design and construction without departing from this invention (e.g., an exteriorly extending hosel member 104, as shown; an internal hosel member; a releasable hosel member; etc.), including conventional designs and constructions as are known and used in the art. Likewise, the shaft 106 may be made of any desired materials and connected to the hosel area 104 (or directly to the club head 102) in any desired manner, including conventional materials, connected in conventional manners, as are known and used in the art. As some more specific examples, if desired, the shaft 106 may be made from steel (including stainless steel), aluminum, or other metal or metal alloy materials; graphite based materials; carbon fiber materials; composite or other non-metal materials; polymeric materials, combinations of various materials, etc. The shaft 106 may be connected to the hosel area 104 and/or directly to the club head 102 via cements or adhesives, via mechanical connection systems, and the like. If desired, the shaft 106 may be connected to the hosel area 104 or to the club head 102 by a releasable mechanical or adhesive connection that easily allows the club head 102 and shaft 106 to be separated from one another (and optionally thereafter engaged with a different head or shaft).

A grip member 108 or other handle element may be provided on and/or integrally formed with the shaft 106. Any desired materials may be used for the grip member 108, such as rubber based materials (synthetic or natural); polymer based materials (including cord or other fabric or textile containing polymers); leather materials (synthetic or natural); etc. The grip member 108 or other handle element may be engaged with or formed as part of the shaft 106 in any desired manner without departing from this invention, including through the use of adhesives or cements, mechanical connectors (e.g., threaded connections), welding, soldering or the like. In some arrangements, the grip or handle member 108 may be integrally formed as a unitary, one-piece construction with the shaft member 106. In at least some example structures according to this invention, the grip member 108 will be made of conventional materials as are known and used in the art, and it will be attached to the shaft member 106 in conventional manners as are known and used in the art.

The club head 102 itself also may be constructed in any suitable or desired manner and/or from any suitable or desired materials without departing from this invention, including from conventional materials and/or in conventional manners known and used in the art. For example, in the example structure 102 shown in FIGS. 1A and 1B, the club head 102 includes a ball striking face member 102a (optionally including a ball striking face plate 102b integrally formed with the face member 102a or attached to club such that the face plate 102b and a frame member together constitute the overall face member 102a). In some arrangements, the ball striking face member 102a and/or ball striking face plate 102*b* may be connected to the remainder of the club head using one or more mechanical fasteners, as will be described more fully below. The club head 102 of this illustrated example further includes a crown 102*c*, a sole 102*d*, and at least one body portion 102*e* located between the crown or top portion 102*c* and the sole 102*d* (e.g., material extending from the face member 102*a*, around the club head periphery from the heel to the toe). This body portion 102*e*, which extends to a location substantially opposite the striking face, may include a rear portion of the club head structure.

A wide variety of overall club head constructions are possible without departing from this invention. For example, if desired, some or all of the various individual parts of the club head 102 described above may be made from multiple pieces that are connected together (e.g., by welding, adhesives, or other fusing techniques; by mechanical connectors; etc.). The various parts (e.g., crown 102*c*, sole 102*d*, and/or body portion(s) 102*e*) may be made from any desired materials and combinations of different materials, including materials that are conventionally known and used in the art, such as metal materials, including lightweight metal materials. More specific examples of suitable lightweight metal materials include steel, titanium and titanium alloys, nickel and nickel alloys, tungsten and tungsten alloys, aluminum and aluminum alloys, magnesium and magnesium alloys, etc.

As additional examples or alternatives, in order to reduce the club head 102 weight, if desired, one or more portions of the club head structure 102 advantageously may be made from a composite material, such as from carbon fiber composite materials that are conventionally known and used in the art. Other suitable composite or other non-metal materials that may be used for one or more portions of the club head structure 102 include, for example: fiberglass composite materials, graphite composite materials, basalt fiber composite materials, polymer materials, etc. As some more specific examples, if desired, at least some portion(s) of the crown member 102*c* may be made from composite or other non-metal materials. Additionally or alternatively, if desired, at least some portion(s) of the sole member 102*d* may be made from composite or other non-metal materials. As still additional examples or alternatives, if desired, one or more portions of the club head's body member 102*e* (e.g., U-shaped or C-shaped ribbons of material that extend around the rear of the club head 102 and from the face component's 102*b* heel edge to the toe edge) may be made from composite or other non-metal materials. As yet further examples, if desired, the entire body portion of the club head aft of a club head face member 102*a* (also called an "aft body"), or optionally the entire club head, may be made from composite or other non-metal materials without departing from this invention. The composite or other non-metal material(s) may be incorporated as part of the club head structure 102 in any desired manner, including in conventional manners that are known and used in the art. Reducing the club head's weight (e.g., through the use of composite or other non-metal materials, lightweight metals, metallic foam or other cellular structured materials, etc.) allows club designers and/or club fitters to selectively position additional weight in the overall club head structure 102, e.g., to desirable locations to increase the moment of inertia, affect the center of gravity location, and/or affect other playability characteristics of the club head structure 102 (e.g., to draw or fade bias a club head; to help get shots airborne by providing a low center of gravity; to help produce a lower, more boring ball flight; to help correct or compensate for swing flaws that produce undesired ball flights, such as hooks or slices, ballooning shots, etc.).

The various individual parts that make up a club head structure 102, if made from multiple pieces, may be engaged with one another and/or held together in any suitable or desired manner, including in conventional manners known and used in the art. For example, the various parts of the club head structure 102, such as the face member 102*a*, the ball striking plate 102*b*, the crown 102*c*, the sole 102*d*, and/or the body portion(s) 102*e* may be joined and/or fixed together (directly or indirectly through intermediate members) by adhesives, cements, welding, soldering, or other bonding or finishing techniques, and the like. In some arrangements, as will be discussed more fully below, the various parts of the club head 102 may be joined by mechanical connectors (such as threads, screws, retaining elements, nuts, bolts, or other connectors or fasteners), and the like. If desired, the mating edges of various parts of the club head structure 102 (e.g., the edges where members 102*a*, 102*b*, 102*c*, 102*d*, and/or 102*e* contact and join to one another) may include one or more raised ribs, tabs, ledges, or other engagement elements that fit into or onto corresponding grooves, slots, flanges, surfaces, ledges, edges, apertures, openings, or other structures provided in or on the facing side edge to which it is joined. Cements, adhesives, mechanical connectors, finishing material, or the like may be used in combination with the raised rib/groove/ledge/edge or other connecting structures described above to further help secure the various parts of the club head structure 102 together.

The dimensions and/or other characteristics of a golf club head structure according to examples of this invention may vary significantly without departing from the invention.

As discussed above, various portions of a golf club head, such as club head 102, may be formed as separate, distinct portions and connected using various types of mechanical fasteners, such as screws. The use of traditional metal screws adds weight to the club head 102 and the added weight may be located in areas of the club where additional weight is undesirable, thereby reducing performance of the club, and where minimizing weight is a priority for design and improved performance of the club. Accordingly, lighter weight mechanical fasteners, such as those made from composite or other non-metallic materials (e.g., carbon fiber) may be used to reduce the overall weight of the club and/or reduce weight in strategic locations within the club.

For instance, club designers often try to move weight associated with the club head to a lower portion of the club head (i.e., nearer the sole of the club head) in order to lower the center of gravity of the club, thereby providing a more forgiving club, or improved club performance which is more robust to variation in player swing approach to impact the ball. Additionally or alternatively, golf club designers often locate weight in the rear of the club in order to aid in providing loft to a golf ball. Use of non-metallic fasteners may aid in reducing weight or relocating weight to these and/or other strategic locations on the club.

Figure 2:
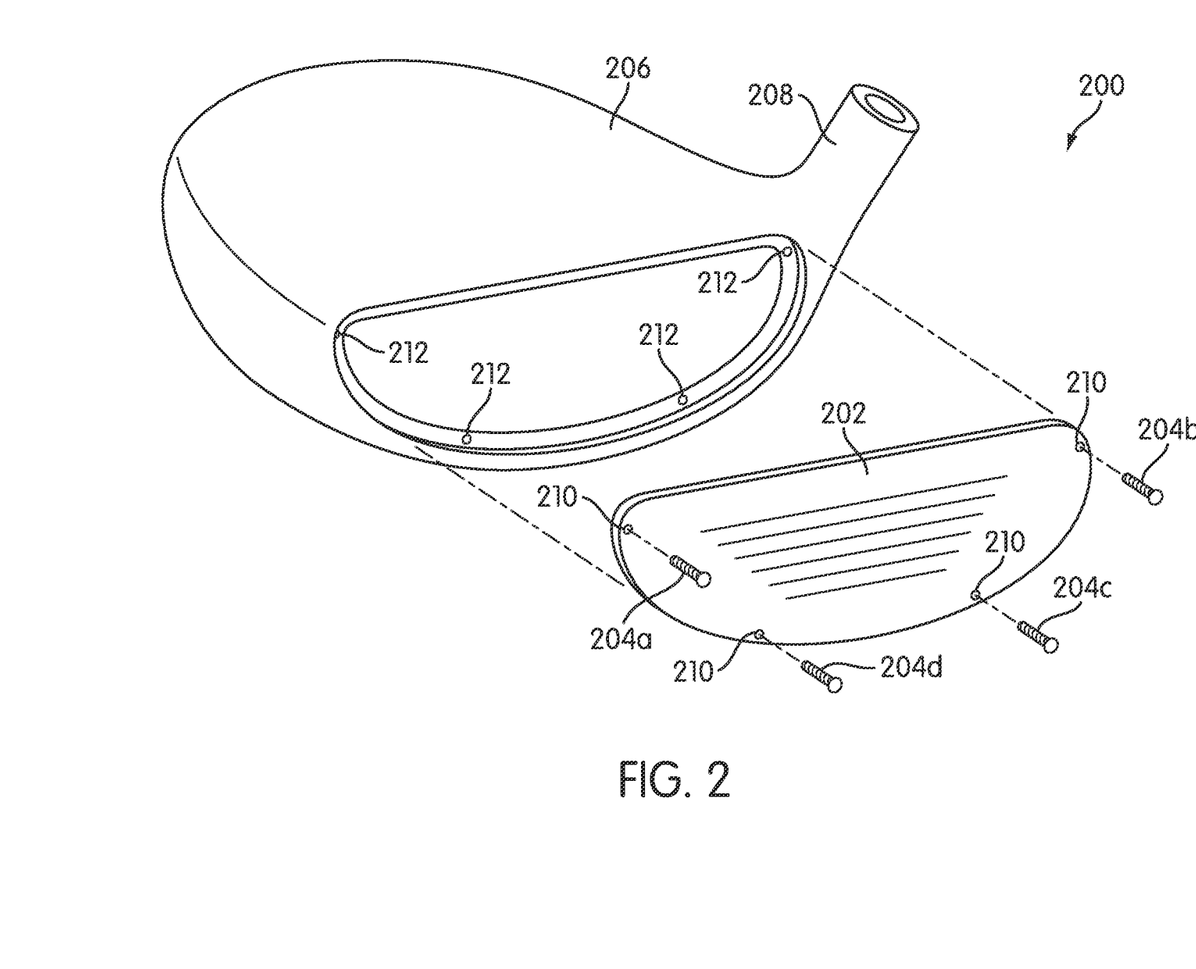
FIG. 2 is an exploded view of a golf club head having non-metallic fasteners in accordance with illustrative aspects of the invention.

FIG. 2 is an exploded view of one example golf club head 200 having fasteners, such as screws 204*a*-204*d*, to fasten a ball striking member or ball striking faceplate 202 to the remainder club head 200. The club head 200 includes a club head body 206 that may be formed of one or more club head portions, as discussed above. For simplification of discussion, the club head body 206 is shown in FIG. 2 as a single piece. However, the club head body 206 may be formed from any of the configurations discussed above. The club head body 206 is connected to the hosel 208 which then connects to the golf club shaft (not shown).

The ball striking member 202 includes a plurality of holes or apertures 210 that may align with holes or apertures 212 in the club head body 206. Screws 204a-204d may be inserted through the apertures 210 in the ball striking member 202 and into the apertures 212 in the club head body 206 to fasten the ball striking member 202 to the club head body 206. Although four screws 204a-204d are shown and are positioned generally around the perimeter of the ball striking member 202, more or fewer screws may be used and the position of the screws may also vary. The number and position of the screws shown is merely one example arrangement and is not intended to limit the invention to the illustrated arrangement.

As discussed above, the screws 204a-204d may be formed of a lightweight, non-metallic material in order to reduce weight associated with the club. For instance, the screws 204a-204d may be formed of carbon fiber, graphite fiber, polyamide fiber, glass fiber, boron fiber, alumina fiber, aramid fiber, basalt fiber, amorphous fiber, and carbon nanotube fiber reinforced composite materials, and combinations of fibers in fiber reinforced composite materials. Any desired polymer matrix or base material may be used and reinforced with the fiber reinforcement. For example the polymer matrix may comprise: thermosetting resins, such as epoxy resins, phenol or urea formaldehyde resins, polyurethane resins, polyester resins, vinyl ester resins and the like; and thermoplastic resins, such as polypropylene resins, polyether ether ketone resins, acrylonitrile-butadiene-styrene resins, nylon resins, etc. Other examples include, but are not limited to, polyphenylene sulfide, polysulfone, polyethylene terephthalate, and polycarbonate resins.

In some arrangements, some or all of the screws 204a-204d may be formed of different materials depending on the location of the screw. For example, heavier material screws may be used to increase weight as desired, while lightweight non-metallic screws may be used in areas where less weight may be desirable. For instance, as club designers endeavor to move weight closer to the bottom or sole of the club, use of heavier screws near the bottom of the ball striking face member 202, (e.g., screws 204c, 204d), and lighter screws near the top of the ball striking face member 202, (e.g., screws 204a, 204b), may lower the center of gravity of the club to provide improved performance characteristics. In one example, screws 204c, 204d may be formed of heavier materials, such as steel, titanium, tungsten, nickel, aluminum, and the like, while screws 204a, 204b may be formed of lighter weight materials, such as carbon fiber, composite materials, and the like. The material chosen for each of screws 204a-204d may vary by weight, density, etc. in order to provide the desired performance characteristics for the club.

Figure 3:
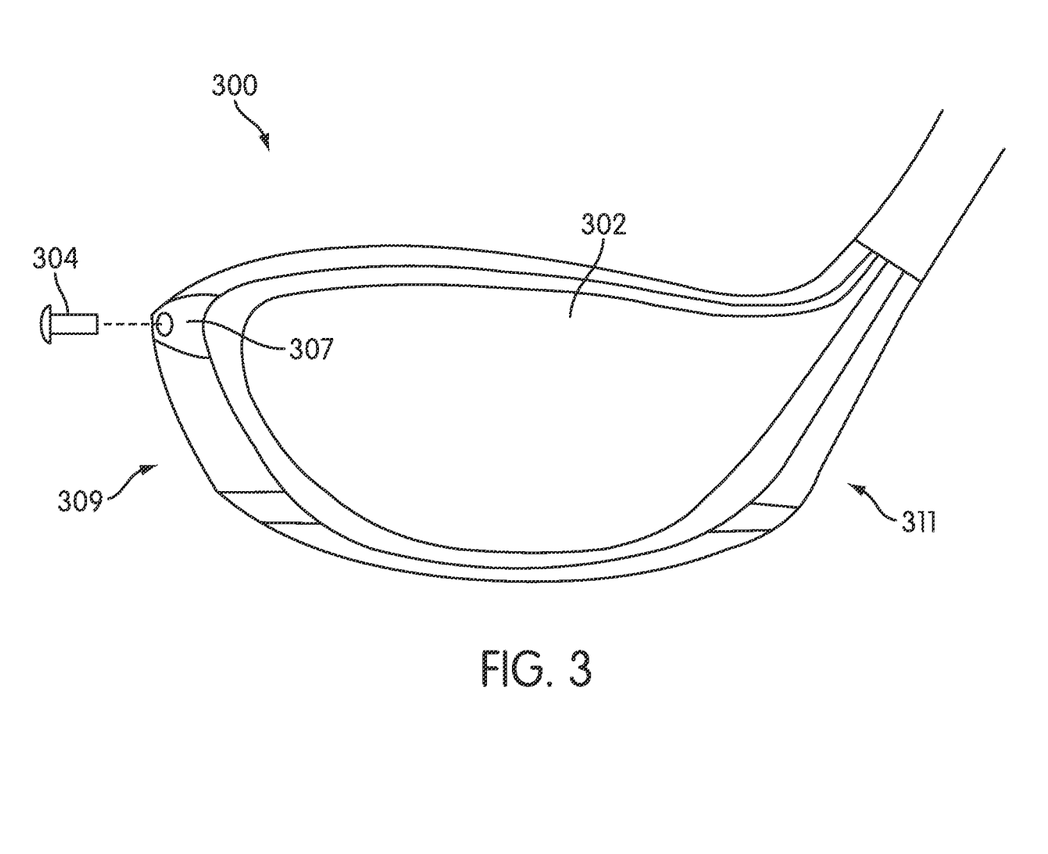
FIG. 3 is an alternate arrangement of an example golf club head having non-metallic fasteners in accordance with illustrative aspects of the invention.

FIG. 3 illustrates another example golf club head 300 having a non-metallic fastener 304. The golf club head 300 shown includes a ball striking member 302 and optionally a ball striking faceplate intended to contact a ball. The ball striking member 302 and ball striking faceplate may be integrally formed as a single piece or may be separately formed and joined via adhesives, mechanical fasteners, cements, and the like. The golf club head 300 further includes one or more body portions 307 that may extend from a toe region of the club 309 to a heel region 311 and may form at least a portion of a rear of the club head 300. As shown, the body portion 307 is fastened to the remainder of the club head 300 (e.g., other body portions, the ball striking member 302, etc.) via a mechanical fastener, such as screw 304. The screw 304 may be formed of a lightweight non-metallic material, such as carbon fiber, in order to reduce weight in the toe area 309 of the club where the screw 304 is positioned. Additional fasteners (not shown) may be used to connect the body portion 307 to the remainder of the club head 300 and may positioned around the club head 300 (e.g., in the rear of the club head, near the heel of the club head, etc.). These fasteners may also be formed of non-metallic materials, such as carbon fiber, as desired.

As discussed above, some or all of the fasteners 304 may be formed of different materials depending on the location of the fastener 304 in order to provide a desired weight distribution. For instance, in one example, three screws 304 may be used to connect body portion 307 to the remainder of the club head 300. The three screws may be positioned at the toe 309 of the club (screw 304) at the rear of the club (not shown) and near a heel 311 of the club (not shown). One desired weight distribution may include reducing weight at the toe 309 and heel 311 while increasing weight at the rear. Accordingly, non-metallic screws may be used at the toe 309 and heel 311 and a metal screw may be used at the rear to provide additional weight.

Figure 4:
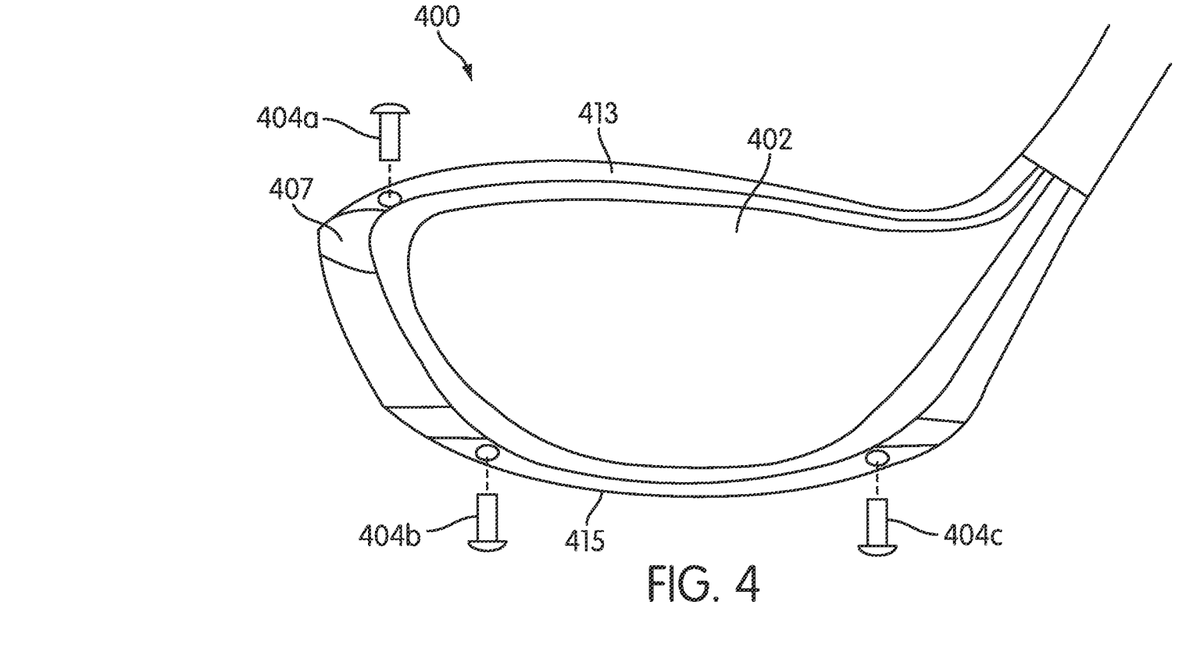
FIG. 4 is yet another arrangement of an example golf club head having non-metallic fasteners in accordance with illustrative aspects of the invention.

FIG. 4 illustrates yet another golf club head 400 having non-metallic fasteners 404a-404c. The golf club head 400 shown includes a ball striking member 402 and, optionally, a ball striking faceplate. The club head 400 may further include one or more body members, such as body member 407. The club head 400 further includes a crown 413 forming a top region of the club head 400 and a sole 415 forming a bottom region of the club head 400. The crown 413 and sole 415 may be connected to the remainder of the club head 400 (e.g., body member(s) 407, ball striking member 402, ball striking faceplate, etc.) via one or more fasteners, such as screws 404a-404c. The number and location of the screws 404a-404c shown is merely one example arrangement and is not intended to limit the invention to the arrangement shown.

In some arrangements, the screws 404a-404c may be formed of lightweight, non-metallic materials such as carbon fiber. In some examples, one or more of the screws 404a-404c may be formed of a lightweight material while others may be formed of heavier materials, such as steel, titanium, nickel, tungsten, aluminum, and the like. As discussed above, a portion of the screws 404a-404c may be formed of heavier materials and may be used in locations where additional weight may be desirable. For instance, adding additional weight in the sole region 415 may lower the center of gravity of the club, thereby providing improved performance characteristics. Accordingly, one or more screws, such as screws 404b, 404c connecting the sole 415 to the remainder of the club head 400, may be formed of heavier materials, such as those listed above, while the screw 404a connecting the crown 413 to the remainder of the club head 400 may be formed of a lightweight non-metallic material, such as carbon fiber.

Figure 5:
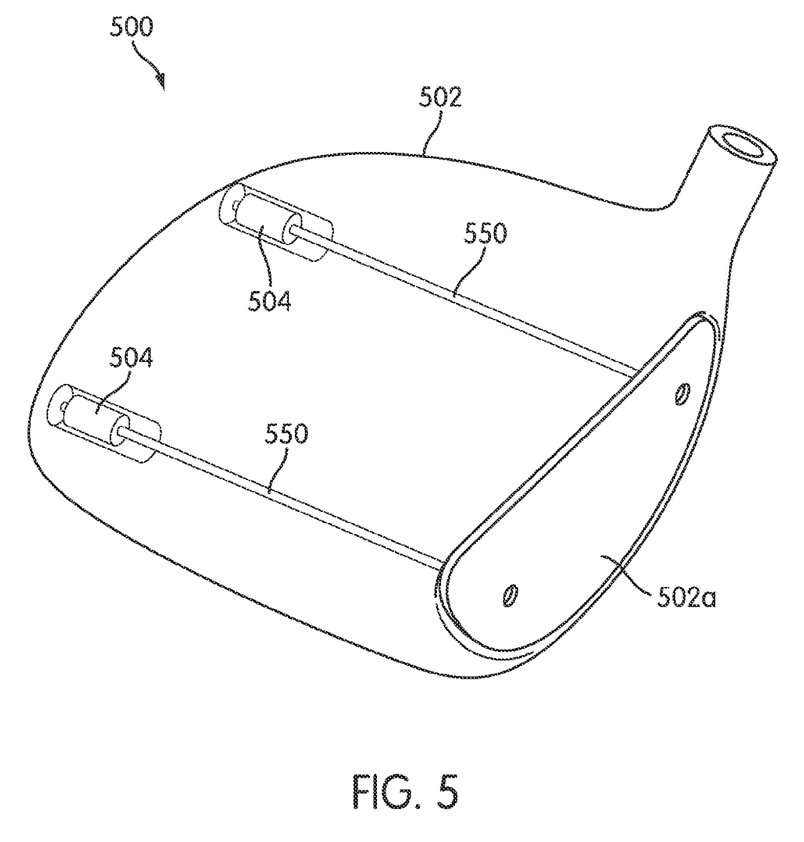
FIG. 5 is still another arrangement of an example golf club head having non-metallic fasteners in accordance with illustrative aspects of the invention.

FIG. 5 illustrates yet another golf club head arrangement having non-metallic fasteners. The club head 502 generally includes a club face 502a. The club face, in some arrangements, may be formed separated from the club head and connected to the club head. The club face 502a may have a constant thickness or the thickness may vary depending on the location on the club face. For instance, in some arrangements, the club face 502a may be thicker near an edge of the club face 502a. In the arrangement shown in FIG. 5, the club face 502a is connected to the club head via a ratcheting fastener system. For instance, the club face 502a may be connected to the club head 502 via ratcheting fasteners 504, such as jack bolts, jack screws, turnbuckle fasteners, and the like that may be positioned at a rear of the club head. The fasteners may be formed of non-metallic or composite materials, such as those discussed above, in order to minimize weight associated with the club head. In some arrangements, a portion of the fasteners 504 may be formed of traditional metal materials, such as those discussed above.

The fasteners 504 may connect to the club face 502a via connectors 550. In some arrangements, the connectors 550 connecting the fasteners 504 to the club face 502a may be rigid rods such as dowel rods made of metal, carbon fiber, composite, plastic, etc. In other arrangements, the connectors 550 may be formed of flexible cable such as cable formed of various non-metallic and metallic materials such as polyaramid (e.g., Kevlar®, Twaron®), liquid crystal polymer (e.g., Vectran™, Vectra®), poly-p-phenylenebenzobisoxazole (PBO), stainless steel filament, fiber, yarn, braid, ribbon, chain, cord or rope. The connectors 550 may extend from the club face 502a to the ratcheting fasteners 504 through an interior region of the club head 502, as shown in FIG. 5. Although FIG. 5 includes two ratcheting fasteners and associated connectors, more or fewer connectors and fasteners may be used.

In some arrangements, the ratcheting fastener system and associated fasteners 504 and connectors 550 may be loaded to various predetermined settings. The predetermined settings may range from 50 to 500 lbf or higher, depending on the number, configuration, and material of construction of fasteners 504 and connectors 550.

Although the figures generally illustrate screws or fasteners of the same size and type being used to connect various portions of the club head, the type and/or size of one or more screws or fasteners may vary as desired. For instance, screws connecting a ball striking member to the club head may be of a first size while screws connecting the crown or sole of the club may be of a second size, different from the first size. In still other arrangements, the screws or fasteners may have varying weight or density based on the type of screw, size, material, location of screw, etc. For example, some non-metallic screws may be heavier or denser than other non-metallic screws. Further, some metal screws may be heavier or denser than other metal screws or other non-metallic screws. Various combinations of different screw size, configuration, material, etc. may be used to connect various portions of the club head without departing from the invention.

In still other arrangements, the configuration of a screw or fastener may vary, in addition to the material, size, etc. from which the screw is formed. For instance, a screw may have a hollow thread area and solid head area in order to further adjust the weight associated with the screw. This example arrangement may be beneficial when connecting, for instance, a sole plate. The head of the screw may be at the bottom of the sole plate where weight is desired. Accordingly, a hollow thread and solid head screw may further lower center of gravity of the club.

In some examples, the screw head portion may be hollow while the thread portion may be solid. This arrangement may shift the weight associated with the screw to the thread region and away from the head region, which may be desirable. In still other arrangements, the thickness of the material used to form the screw may vary. Varying thickness may alter the overall weight associated with one or more screws being used to connect various portions of the club head.

These differing configurations relating to, for example, material, density, thickness, solid portions, hollow portions, etc. of the screw may be adjusted for screws made of any material (e.g., composite, metal, non-metallic, etc.) and used to connect any of the various portions of a club head in order to adjust the performance characteristics associated with the club.

CONCLUSION

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:
1. A golf club head, comprising:
   a club head body;
   a ball striking face;
   a ratcheting fastener system connecting the ball striking face to the club head body, the ratcheting fastener system including:
      at least one ratcheting fastener;
      at least one ratcheting connector extending from the at least one ratcheting fastener to the ball striking face; and
   wherein the at least one ratcheting connector is a rigid rod.
2. The golf club head of claim 1, wherein the ratcheting fastener system further includes at least one of jack bolts, jack screws and turnbuckle fasteners.
3. The golf club head of claim 1, wherein the at least one ratcheting connector is formed of a metal.
4. The golf club head of claim 1, wherein the at least one ratcheting connector is formed of a non-metallic material.
5. The golf club head of claim 4, wherein the at least one ratcheting connector is formed of a composite material.
6. The golf club head of claim 5, wherein the at least one ratcheting fastener is formed of a composite material.
7. The golf club head of claim 1, wherein the at least one ratcheting fastener is formed of a non-metallic material.
8. A golf club head, comprising:
   a club head body;
   a ball striking face;
   a ratcheting fastener system connecting the ball striking face to the club head body forming a hollow interior, the ratcheting fastener system including:
      at least one ratcheting fastener positioned at a rear of the club head body;
      at least one ratcheting connector extending linearly through the hollow interior from the at least one ratcheting fastener to the ball striking face; and
   wherein the at least one ratcheting fastener has at least a portion visible from outside the club head body.
9. The golf club head of claim 8, wherein the ratcheting fastener system further includes at least one of jack bolts, jack screws and turnbuckle fasteners.
10. The golf club head of claim 8, wherein the at least one ratcheting connector is a rigid rod.
11. The golf club head of claim 10, wherein the at least one ratcheting connector is formed of a metal.
12. The golf club head of claim 10, wherein the at least one ratcheting connector is formed of a non-metallic material.
13. The golf club head of claim 12, wherein the at least one ratcheting connector is formed of a composite material.

* * * * *